United States Patent [19]

Croy et al.

[11] 4,191,256
[45] Mar. 4, 1980

[54] SUBSEA FLOWLINE CONNECTOR

[75] Inventors: David G. Croy; Andrew J. Rafferty; Richard D. Jolly, all of Houston, Tex.

[73] Assignee: Cameron Iron Works, Inc., Houston, Tex.

[21] Appl. No.: 898,968

[22] Filed: Apr. 21, 1978

[51] Int. Cl.² .............................................. E21B 7/12
[52] U.S. Cl. .................................... 166/343; 166/344; 166/356; 141/65; 141/387; 285/26; 285/DIG.21; 405/195
[58] Field of Search .............. 166/341, 343, 342, 344, 166/345, 367, 340, 356; 405/165, 169, 170, 210, 204; 114/322, 323, 334, 336; 285/24-29, 308, 321; 141/65, 387

[56] References Cited

U.S. PATENT DOCUMENTS

| 3,090,437 | 5/1963 | Geer | 285/27 |
|---|---|---|---|
| 3,260,270 | 7/1966 | Watkins | 166/343 X |
| 3,345,087 | 10/1967 | Hanes et al. | 285/321 X |
| 3,358,753 | 12/1967 | Haeber | 175/7 |
| 3,482,410 | 12/1969 | Roesky et al. | 405/169 |
| 3,585,805 | 6/1971 | Vincent | 285/24 |
| 3,592,014 | 7/1971 | Brown et al. | 405/169 |
| 3,795,115 | 3/1974 | Bergquist et al. | 285/18 |
| 3,967,462 | 7/1967 | De Jong | 166/343 X |
| 4,004,635 | 1/1977 | Marquaire et al. | 166/356 X |
| 4,019,334 | 4/1977 | Sinclair et al. | 405/169 |
| 4,075,862 | 2/1978 | Ames | 166/343 |
| 4,102,146 | 7/1978 | Dietrich | 405/169 |

Primary Examiner—James A. Leppink
Assistant Examiner—Richard E. Favreau
Attorney, Agent, or Firm—Vinson & Elkins

[57] ABSTRACT

A subsea flowline connector for connecting a flowline through a port in a subsea atmospheric chamber vessel to a subsea christmas tree within the chamber including an actuator assembly within the chamber with at least one arm extending through the vessel adjacent the port, a carriage supported on the end of a flowline, a piston secured to the flowline and supported on the carriage, a receptacle on the piston to engage the arm, a flowline passage through the piston, actuation of said actuator moving said arm into engagement with said receptacle and pulling said piston into engagement with the port, a valve controlled bleed line to bleed pressure from said port as the piston has moved therein and a lock for retaining the piston within the port.

9 Claims, 10 Drawing Figures

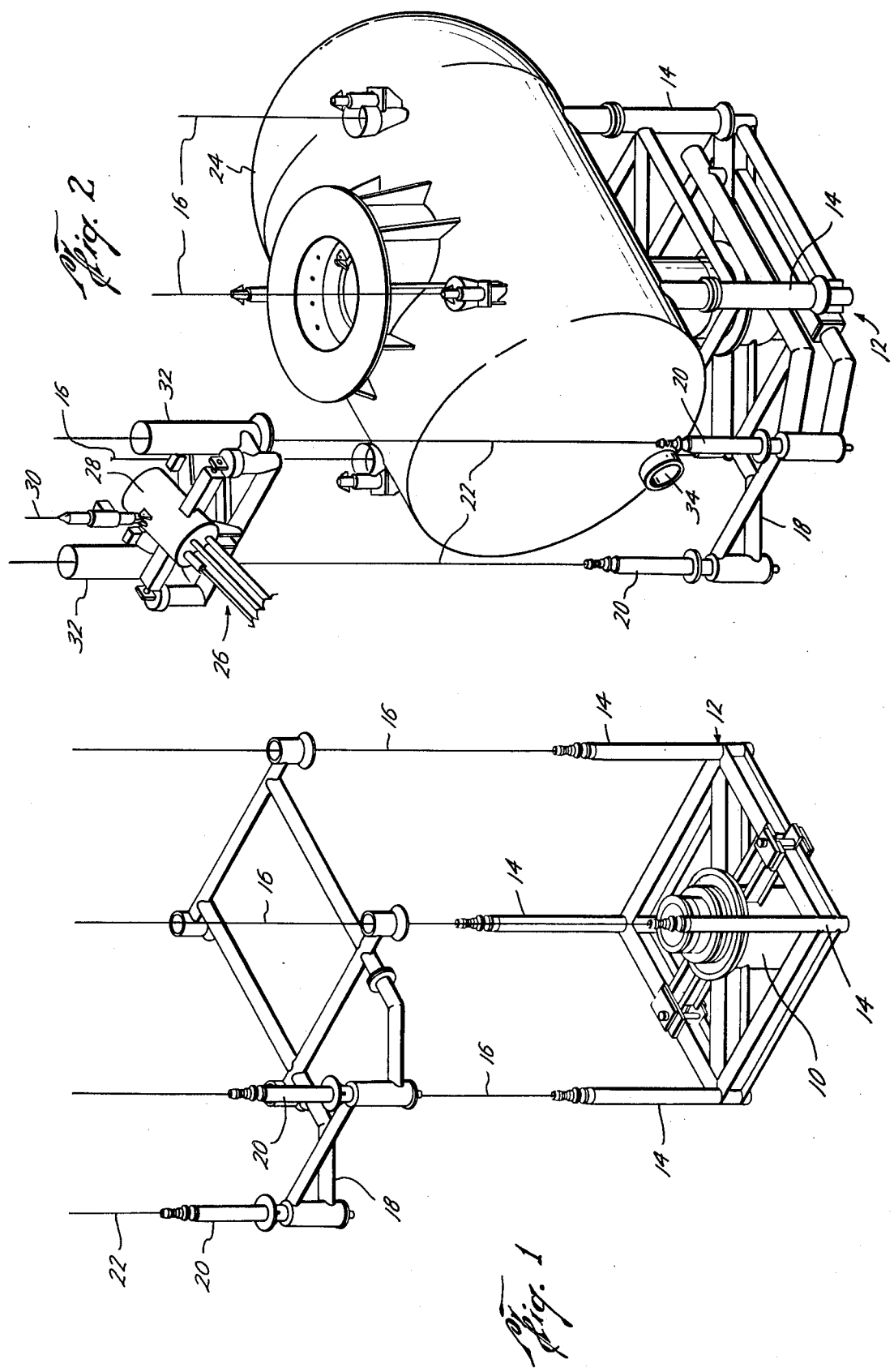

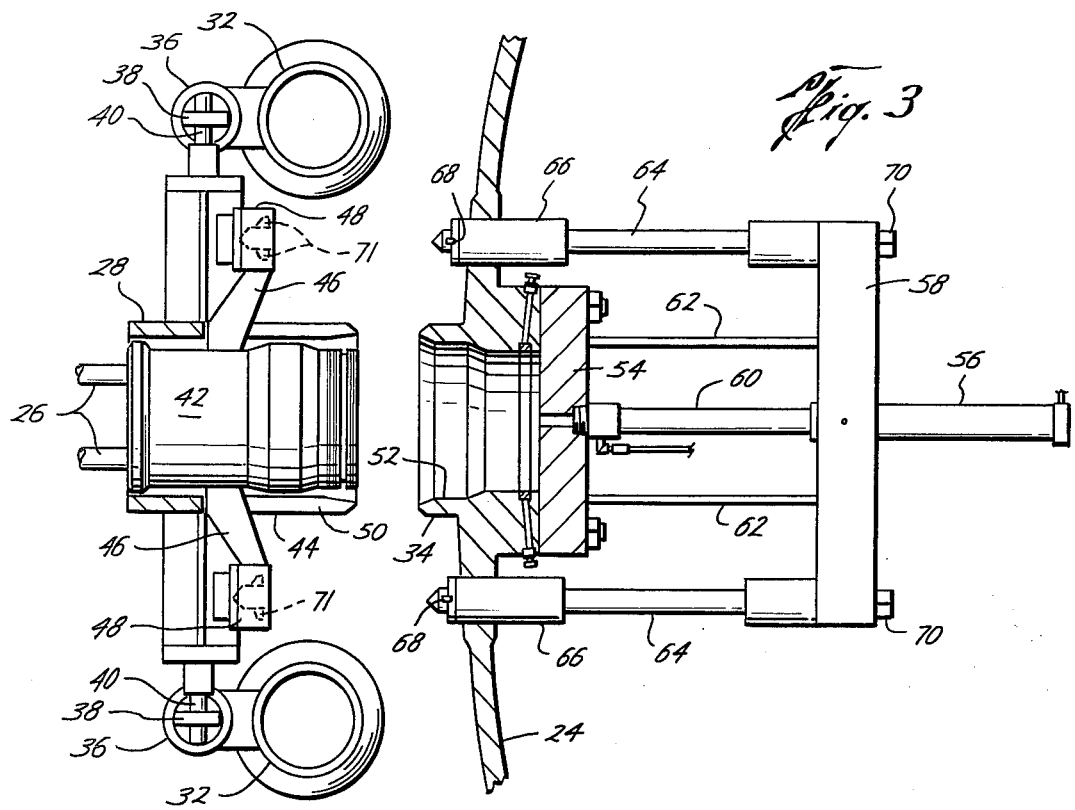
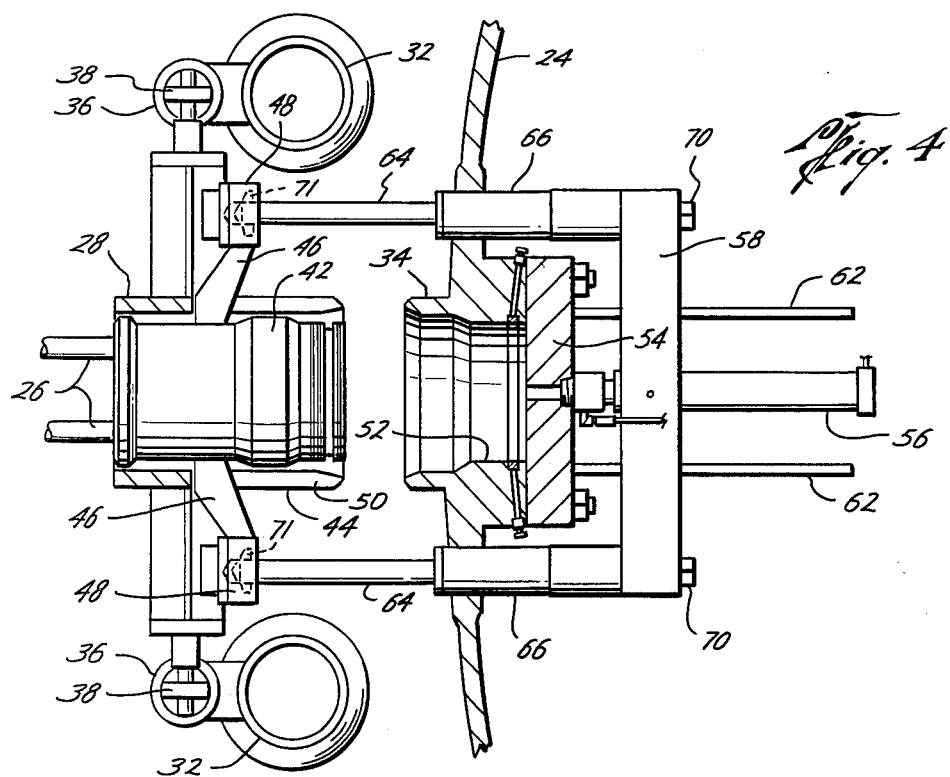

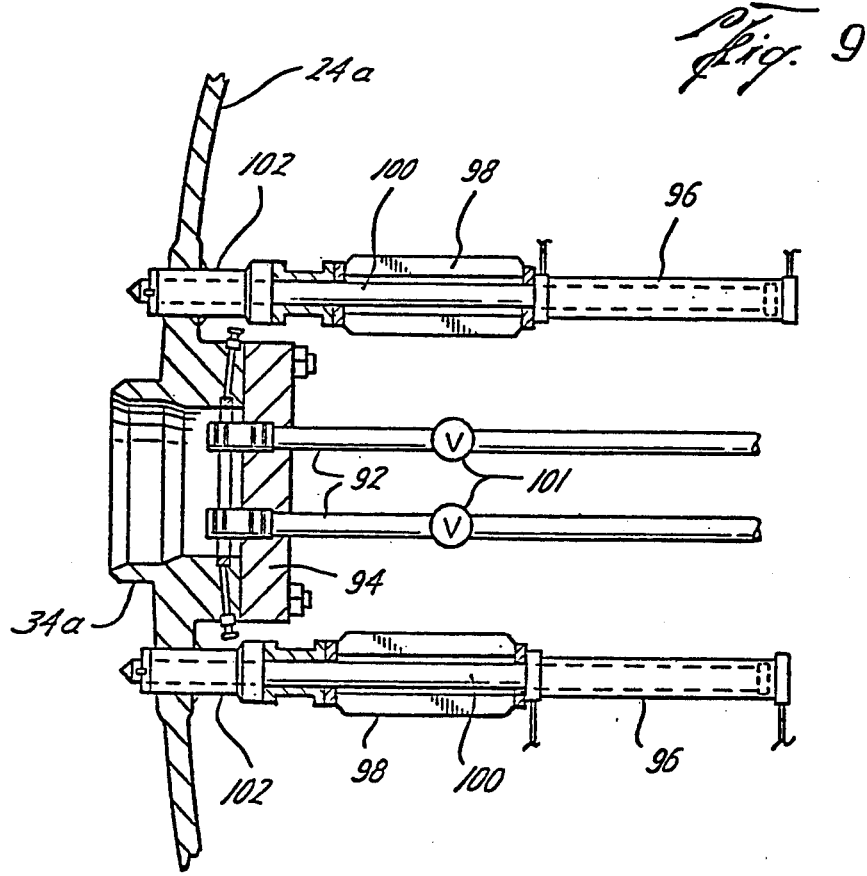
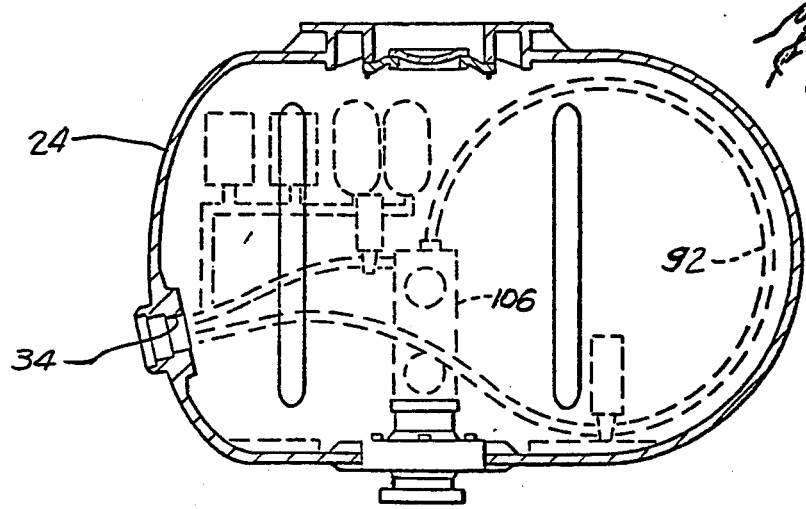

SUBSEA FLOWLINE CONNECTOR

BACKGROUND OF THE INVENTION

With the increased drilling for oil and gas in offshore locations and particularly in water too deep for divers atmospheric chambers have been installed on wellheads on the floor of the ocean. These chambers allow the crew to be delivered to the location in a diving bell or a submarine and to perform completion, connection and workover tasks in an environment in which they can work efficiently for reasonable periods of time.

One of the problems with these chambers has been the making of a connection through the chamber wall from the wellhead production flowlines within the chamber to a pipeline on the exterior of the chamber. Prior to the present invention efforts to bring a pipeline into communication with the chamber have been attempted with cables and winches. The R. R. Roesky et al U.S. Pat. No. 3,482,410, the A. J. Bergquist et al U.S. Pat. No. 3,795,115, the J. DeJohn U.S. Pat. No. 3,967,462, the J. P. Oliver U.S. Pat. No. 3,835,655, the B. J. Watkins et al U.S. Pat. No. 3,260,270, the W. Brown et al U.S. Pat. No. 3,592,014 and the R. A. Marquaire et al U.S. Pat. No. 4,004,635 are examples of the use of cables and winches to pull pipelines into connection with an undersea installation. The L. E. Williams et al U.S. Pat. No. Re. 27,340 discloses an underwater connector between a pipeline and a production wellhead in which yokes engage aligned hubs and pull them together for securing by a clamp remotely operated mechanically by a drill string extending to the surface.

Difficulties have been encountered with the use of cables and winches and in some instances connections could not be made. Further, the christmas tree could not be installed and tested in some of these prior chamber structures until the flowline had been pulled in by the cable. Thus, the christmas tree had to be installed and tested at the sea bottom. Also, such prior art connectors could not be lowered and retrieved independently of the chamber to which they are connected.

SUMMARY

The present invention relates to an improved underwater flowline connector which provides a connection from production flowlines of a wellhead within a subsea production chamber to a subsea pipeline extending from such chamber.

The improved underwater flowline connector has at least one arm extending through the wall of the subsea production chamber which engages a piston on the end of a flowline to pull the piston into the chamber flowline port and includes bleed means to reduce the pressure and bleed water from the space between the piston and the port and means for locking the piston in the port when it has seated.

An object of the present invention is to provide an improved flowline connector for use with a subsea atmospheric production chamber in which the christmas tree may be installed in the chamber and subjected to hydrostatic testing before it is lowered into the water.

A further object is to provide an improved subsea flowline connector for a subsea atmospheric production chamber in which the connector and flowline may be set on the bottom before the chamber is set on bottom.

Another object is to provide an improved subsea flowline connector for a subsea atmospheric production chamber which connector may be lowered to the bottom and recovered therefrom independently of the chamber.

BRIEF DESCRIPTION OF THE DRAWINGS

These and other objects and advantages of the present invention are hereinafter set forth and explained with reference to the drawings wherein:

FIG. 1 is an isometric view of a subsea wellhead with the usual guide frame and post structure thereon and a flowline connector guide frame being lowered on the guidelines.

FIG. 2 is an isometric view with the subsea chamber seated on the wellhead and the improved flowline connector of the present invention being lowered into position on the flowline guide posts.

FIG. 3 is a sectional view taken through the subsea chamber flowline port and showing the improved flowline connector.

FIG. 4 is a sectional view showing the arms extended and engaged in the piston receptacles.

FIG. 9 is a view of a modified form of actuator for use with the flowline connector of the present invention.

FIG. 10 is an elevation view of the subsea chamber showing the christmas tree and flowline loops therein.

DESCRIPTION OF THE PREFERRED EMBODIMENTS

Figure 5:
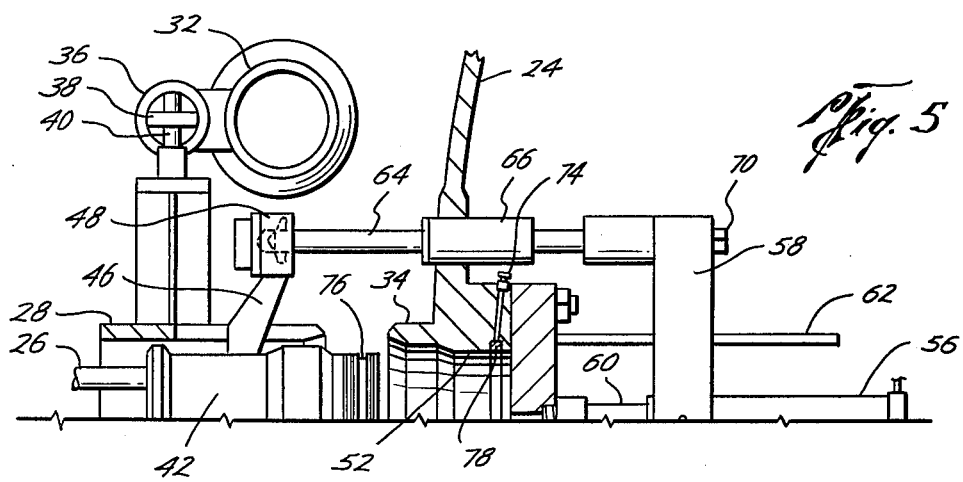
FIG. 5 is a partial sectional view showing the piston being pulled toward the flowline port.

The subsea wellhead 10 in FIG. 1 is shown having a guide frame assembly 12 landed thereon. The guide frame assembly 12 has the four upstanding guide posts 14 on the usual six foot radius from the wellhead bore and guide lines 16 extending to the water surface. A flowline connector guide frame 18 is shown being lowered on the guide lines 16. A running tool (not shown) is normally used for lowering flowline connector guide frame 18. When flowline connector guide frame 18 is seated on guide frame assembly 12 it is locked in place. It has two guide posts 20 with the guide lines 22 extending upward from the posts 20 to the surface. With this configuration the subsea production chamber 24 and the end of flowlines 26 may be lowered into position on guide lines 16 and 22.

In FIG. 2, the subsea chamber 24 has been lowered onto the guide posts 14 and has been connected through the usual remote connector (not shown) to the wellhead 10. The details of the preferred construction are shown in patent application Ser. No. 899,000 filed Apr. 21, 1978 of David G. Croy and entitled "Subsea Production Chamber". Also, the end of flowlines 26 having the improved carriage 28 of the present invention mounted thereon is shown being lowered on the guide lines 22 under the support of cable 30. The carriage 28 is supported by the guide posts 20 to position the flowlines 26 and carriage 28 in their desired positions with respect to flowline port 34 in chamber 24.

The carriage 28 is supported from guide tubes 32 by the vertical suspension assemblies 36 which are rigidly supported from the tubes 32 and by the lateral movement gimbal assemblies 38 which provide the support from the vertical suspension assemblies 36 to the pins 40 extending from the outer ends of the carriage 28. The vertical suspension assemblies 36 are simple resiliently loaded cylinders which allow some vertical movement of the carriage with respect to the tubes 32. Also, these assemblies 36 provide a cushioning of any jar upon seating of the tubes 32 on the posts 20. The gimbal assemblies 38 allow a tilting of the carriage 28 and a lateral movement with respect to the tubes 32. This support of the carriage 28 allows connections to be made through port 34 even though carriage 28 is not completely aligned therewith.

In FIG. 3, the piston 42 is supported in the sleeve 44 of carriage 28. Piston 42 includes arms 46 extending outwardly on each side with each arm 46 terminating in receptacle 48. Sleeve 44 includes slots 50 through which arms 48 extend and may slide as hereinafter explained.

The flowline port 34 has a bore 52 for receiving piston 42. Flange 54 (shown schematically) is fastened to port 34 and closes the interior of bore 52. Actuator 56 is secured to the yoke 58 and has its piston rod 60 secured to flange 54, as shown, so that actuation of actuator 56 causes yoke 58 to move toward and away from flange 54. Yoke 58 is stabilized in its movement by the alignment rods 62 which are secured to and extend from flange 54 as shown. The arms 64 connect through seal glands 66 and extend toward the receptacles 48. The outer end of arms 64 are conical in shape and include the ears 68 which are mated with an annular recess 71 in receptacle 48 to secure arms 64 therein.

As shown in FIG. 3, the flowlines 26 and carriage 28 have been lowered into position on the guide frame 18 and the piston 42 is generally aligned with the bore 52 of flowline port 34. Actuator 56 is in position with its piston rod 60 fully extended so that arms 64 are in their fully retracted position. At this point, personnel are brought to the chamber 24 to control the connection operations. Actuator 56 is provided with a suitable pressure fluid to its port closest to flowline port 34 which causes the piston rod 60 to be drawn toward the actuator 56. Since the end of piston rod 60 is secured to flange 54, the actuator 56 forces yoke 58 toward the port 34 and arms 64 slide through the glands 66 toward their respective receptacles 48. As the ends of arms 64 enter receptacles 48, their conical points move the piston 42 into substantial alignment with port 34. With the ends of arms 64 set in receptacles 48, the arms 64 are rotated by any suitable means such as manually by putting a wrench on the square ends 70 of arms 64 which project beyond yoke 58. This moves the ears 68 into recesses 71 within receptacles 48 so that retraction of arms 64 pulls receptacles 48 and piston 42 toward port 34. This engagement is shown in FIG. 4.

FIG. 5 illustrates the movement of piston 42 toward port 34 responsive to the retraction of the arms 64 after their ends have been engaged within receptables 48. The means positioning piston 42, arms 46 and receptacles 48 with respect to carriage 28, is released by the rotation of arms 64 to set the ears 68 within receptacles 48.

Figure 6:
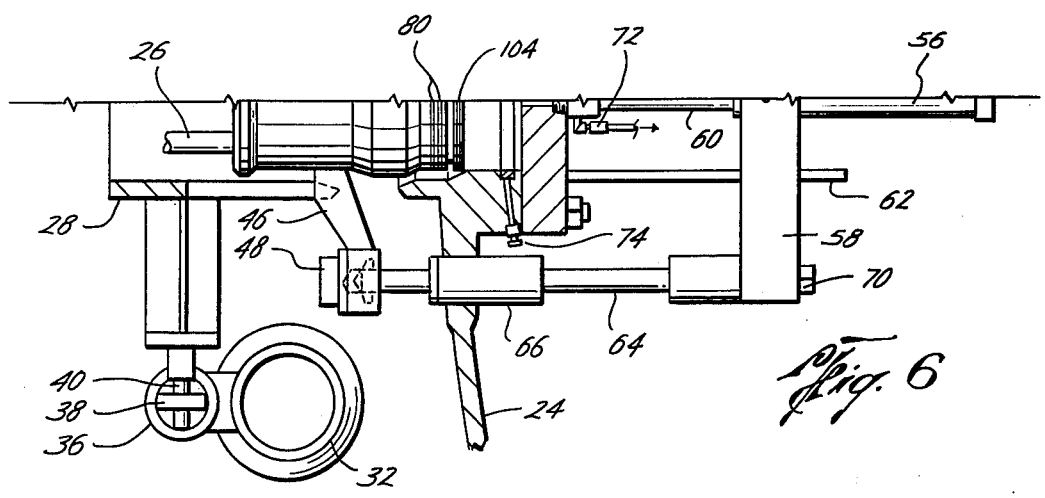
FIG. 6 is a partial sectional view showing the piston approaching its seat in the flowline port.

Once the forward seal 104 of the piston 42 touches the bore 52 of the port 34 as shown in FIG. 6, the bleed valve 72 is opened. This creates a pressure differential across piston 42 to assist it in seating in bore 52 of port 34. This pressure differential results from the atmospheric pressure of chamber 24 being on one side of piston 42 and the larger pressure of the hydrostatic head of water on the other side. Even though this assist would not be needed it prevents trapping of a volume of water within port 34 which would prevent the seating of piston 42.

Figure 7:
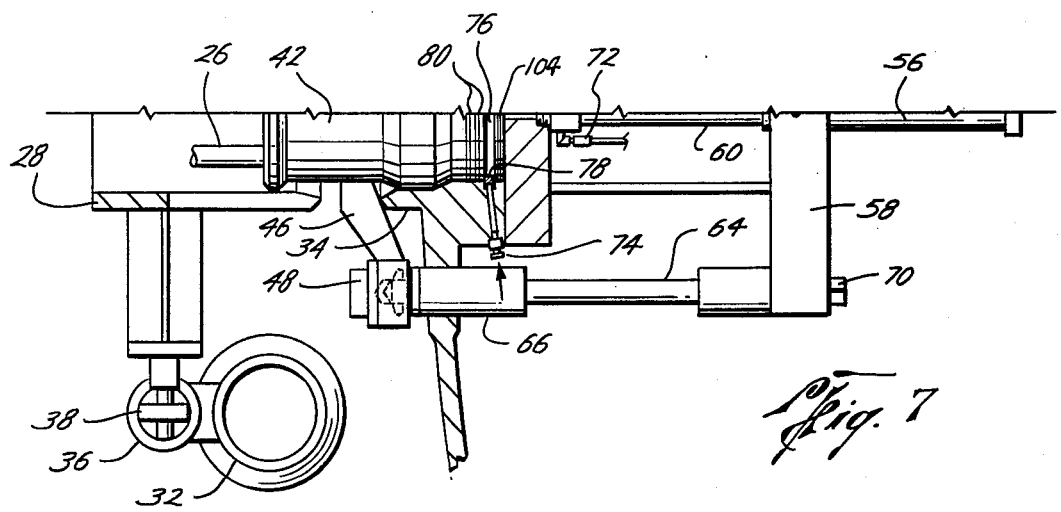
FIG. 7 is another partial sectional view showing the piston in seated and locked position within the flowline port.

The seating of piston 42 is shown in FIG. 7. Once piston 42 has moved completely into bore 52, the lock ring actuators 74 are operated to force the split lock ring 76 into the groove 78 around the exterior of piston 42. Suitable seals 80 are provided between the exterior of piston 42 and the bore 52.

Once piston 42 is seated, the annulus is pressure tested along with the flowline bores. Thereafter, the actuator 56, yoke 58, piston rod 60 and alignment rods 62 are removed and the connections made from piston 42 to the christmas tree within chamber 24. At any time the flowline connection can be released and recovered at the surface by reversing the above recited procedure.

Figure 8:
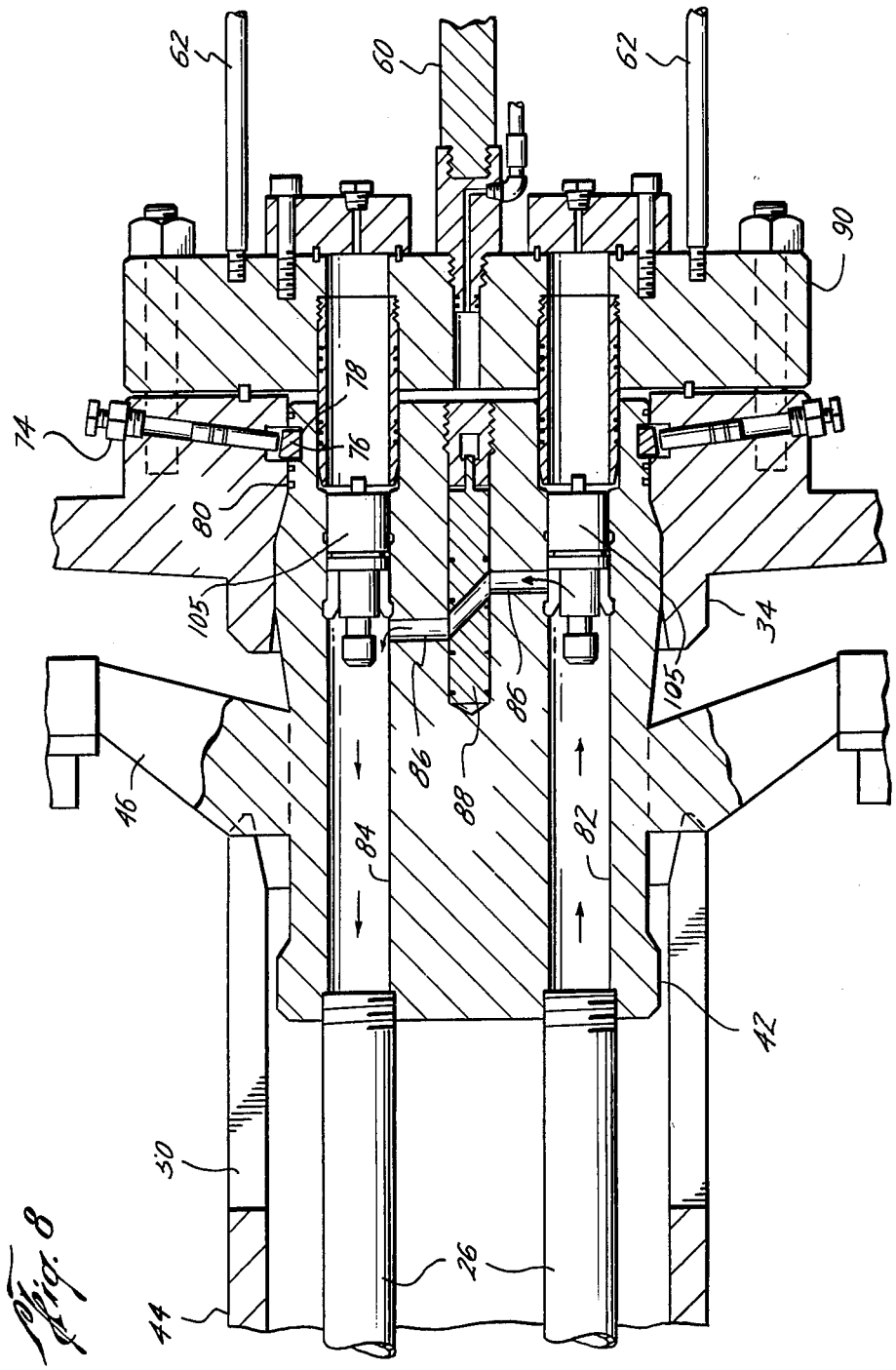
FIG. 8 is a detailed sectional view of the improved flowline connector and showing an isolation valve in open position.

In FIG. 8 the piston 42 is illustrated as seated and locked in port 34. The flowlines 26 are in communication with passages 82 and 84 through piston 42. The by-pass 86 provides a communication between the passages 82 and 84 when valve 88 is in the position shown in FIG. 8. In this position, circulation can be established through one of the flowlines and returned through the other of the flowlines as shown in FIG. 8. This allows circulation of drifting equipment and any other type of equipment or tools prior to the connection to the christmas tree. As is well known in the art, the flowline plugs 105 can be removed, through the flowline tools or from inside the chamber by using a reach rod lubricator. After the flowlines 26 have been connected, the rod 60 and bleed valve 72 are removed from flange 90 and valve 88 is moved to a closed position to close the by-pass 86. Thereafter, all control of flow is accomplished through the valving of the christmas tree 106 and the shut-off valves within the chamber.

The modified form of structure shown in FIG. 9 has an actuator system which allows the flowline loops 92 to be connected into the flange 94 without interference with the making and breaking of the flowline connection through port 34a of chamber 24a. Therefore, the christmas tree flowloops and valving can be installed completely and connected to the flange 54 and pressure tested at the surface prior to being lowered to the sea floor. The improved actuator system shown in FIG. 9 includes a pair of actuators 96 supported by ribs 98 and with the arms 100 (being the piston rods of the actuators 96) extending through the ribs 98 and the glands 102 to the exterior of chamber 24a. The flow through pipes 92 can be controlled by shut-off valves 101 or by the remotely operable christmas tree valving.

From the foregoing it can be seen that the improved flowline connector of the present invention does not rely on using cables for pulling a pipeline into engagement with a port in a subsea chamber is controlled from within the chamber and the flowlines may be disconnected and returned to the surface at any time without disturbing or removing the chamber.

What is claimed is:

1. A flowline connector for providing a connection from a production wellhead within a subsea dry production chamber to a flowline on the exterior of the chamber comprising an actuator assembly positioned within a subsea production chamber and having at least one actuator and at least one actuator arm extending from said actuator through the wall of said chamber, a carriage supported on the flowline, at least one receptacle mounted on said carriage having a means for retaining the end of said actuator arm therein, a piston secured to said receptacle and movably mounted on said carriage, a flowline passage carried by said piston, said chamber having a port for receiving said piston and said flowline passage, said actuator having sufficient travel to move said arm into engagement with said receptacle and to pull said piston into a sealed position within said port.

2. A flowline connector for providing a connection from a production wellhead within a subsea dry production chamber to a flowline on the exterior of the chamber comprising an actuator assembly positioned within a subsea production chamber and having at least one actuator and at least one actuator arm extending from said actuator through the wall of said chamber, a carriage connected to the flowline, at least one receptacle mounted on said carriage having a means for retaining the end of said actuator arm therein, a piston secured to said receptacle and movably mounted on said carriage, a flowline passage through said piston, a flowline connected to said piston in communication with said flowline passage, said chamber having a port for receiving said piston, said actuator having sufficient travel to move said arm into engagement with said receptacle and to pull said piston into a sealed position within said port.

3. A flowline connector according to claim 2 including a bleed line connecting into the space between the piston and the inner end of said flowline port, and a valve in said bleed line for controlling flow therethrough, the bleeding of fluid through said bleed line after said piston has sealed within the bore of said port creating a presure differential on said piston to force it into its seated position.

4. A flowline connector according to claim 2 wherein said actuator assembly includes two arms extending through the wall of said chamber, and two receptacles are mounted on said carriage.

5. A flowline connector according to claim 4 including a yoke joining said arms and connected to said actuator assembly whereby operation of said actuator moves said yoke and said arms.

6. A flowline connector according to claim 4 including two actuators, each of said actuators having a piston rod and said piston rods being said arms, and means for supporting said actuators within said chamber.

7. A flowline connector according to claim 2 including means for releasably retaining said piston within said port.

8. A flowline connector according to claim 7 wherein said piston retaining means includes a split ring, a groove in the exterior of said piston, a groove in the interior of said port, and means for forcing said split ring from said port groove into position partially in each of said grooves to retain said piston in seated position.

9. In a subsea well production unit having a subsea wellhead, a guide frame mounted on said wellhead and having a plurality of upstanding chamber guide posts, a subsea well production chamber lowered onto and positioned by said chamber guide posts and having a christmas tree therein connected to said wellhead, a flowline to be connected through a flowline port in said chamber to the production flowline of the christmas tree within said chamber, a flowline connector comprising a flowline connector guide frame lowered onto said chamber guide posts below said chamber and having a plurality of upstanding flowline guide posts, said flowline guide posts being positioned in a preselected spaced relationship with the flowline port of said chamber, an actuator within said chamber operatively connected to a pair of arms extending through the shell of said chamber in preselected relationship to said port, a flowline piston having at least one passage therethrough and being connected to said flowline so that said flowline is in fluid communication with said passage, and a pair of receptacles secured to said piston in preselected spaced relationship to receive said arms whereby said arms may engage in said receptacles and pull said piston into engagement with said flowline port to connect the flowline to the production flow from the christmas tree within said chamber.

* * * * *